Figure 1:
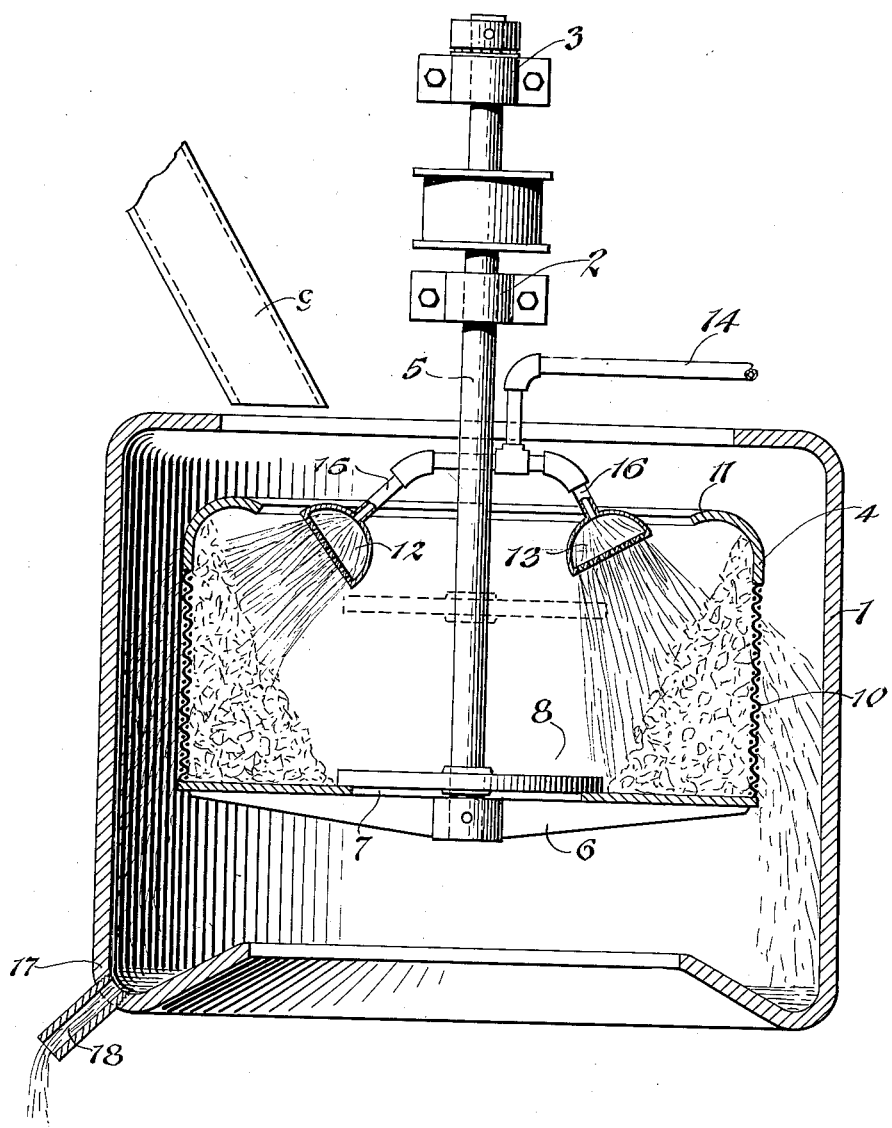

Aug. 1, 1933.  W. MINNIS  1,920,517
PURIFICATION OF SOLID AROMATIC COMPOUNDS CONTAINING ADHERING IMPURITIES
Filed June 7 1929

Inventor
WESLEY MINNIS
by Forbes Silsby
Attorney

Patented Aug. 1, 1933

1,920,517

UNITED STATES PATENT OFFICE 1,920,517

PURIFICATION OF SOLID AROMATIC COMPOUNDS CONTAINING ADHERING IMPURITIES

Wesley Minnis, Buffalo, N. Y., assignor to National Aniline & Chemical Company, Inc., New York, N. Y., a Corporation of New York Application June 7, 1929. Serial No. 369,241

9 Claims. (Cl. 260—142)

This invention relates to the purification of a solid aromatic organic chemical substance or compound having impurities upon its surfaces, and more particularly to the purification of p-nitrotoluene.

One object of the present invention is to simplify and reduce the cost of purification of such substances. Another object is the cheap production of purified p-nitrotoluene.

These and other objects are accomplished according to the present invention, by subjecting a solid aromatic organic substance in the form of particles, for example, crystals of crude p-nitrotoluene or crude naphthalene, having an impurity, particularly a liquid impurity, adhering to its surfaces, to the action of a stream of liquid heated above ordinary or room temperature, and in which both the solid substance and the adhering impurity are insoluble. The process of the present invention is to be distinguished from the common methods of purification wherein a solid (or liquid) substance containing impurities is washed with a liquid in which the impurities but not the solid (or liquid) substance are soluble, or in which the solid (or liquid) substance but not the impurities is soluble. In accordance with the present invention, neither the solid substance nor the adhering liquid impurity is substantially soluble in the stream of washing liquid. Preferably, the stream of liquid is heated to a temperature above the melting point of the solid substance, although in some instances good results may be obtained by employing lower temperatures. The process is conveniently performed by spraying a porous or agglomerate mass of particles of the solid substance, e.g., a mass of crystals, contained in the rotating basket of a centrifugal dryer with the liquid which is heated above room temperature.

The invention may be applied to the purification of p-nitrotoluene obtained, for example, as follows: A mixture of isomeric nitrotoluenes is prepared by nitrating toluene with a mixture of sulfuric and nitric acids. The mixture of isomers is separated from the spent acid, and is washed until substantially acid free. The mixture of isomers is then fractionally distilled in vacuo whereby a distillate consisting principally of the ortho isomer, and a distillate containing most of the meta isomer are obtained. The residue remaining in the still which contains a high proportion of the para isomer can be distilled off as a separate fraction if desired. The fraction so obtained consists essentially of the para isomer admixed with minor quantities of the ortho and meta isomers. This distillate containing the para isomer as the major portion, or the still residue, is cooled to 0° to —10° C., whereby most of the para isomer crystallizes out leaving a mother liquor which contains the ortho and meta isomers, and a minor quantity of the para isomer. The crystals of the para isomer are freed from excess adhering mother liquor by pressing and centrifuging. The above described process is known in the art. The p-nitrotoluene which crystallizes as above described holds or carries adhering to its surfaces a portion of the mother liquor. This mother liquor is not aqueous but is oily, and cannot be dislodged completely by pressing and centrifuging the crystalline mass. Heretofore, it has been removed by other means, as by crystallization from a suitable solvent, which means are objectionable because they increase the cost of production of the pure or purified product.

As applied to the purification of p-nitrotoluene, the present invention comprises subjecting the crude or impure crystals of p-nitrotoluene obtained by the above process, or by any other convenient method, to the action of a stream of liquid in which neither the mother liquor nor the crystals are substantially soluble, for example, water, at a temperature above the melting point of the crystals. This application of the invention will be further described with reference to the accompanying drawing wherein a preferred form of apparatus is disclosed for carrying out the invention.

In the drawing, Fig. 1 represents a cross section of a centrifugal dryer with liquid spray attachment.

Referring to the drawing, the numeral 1 represents the outer casing of a conventional type of centrifugal dryer. Rotatably held within the casing and suspended from the bearings 2, 3, is the dryer basket 4. The basket is secured to the shaft 5 by means of the spider 6 on its bottom. An opening 7 is provided in the bottom of the basket (which during operation of the dryer is covered by the vertically slidable plate 8) to permit the discharge of washed material therethrough. Material to be washed is charged into the basket by means of the chute 9.

The basket as shown is of conventional construction, the wall being of fine mesh screen 10, and the upper edge being turned inward at 11 to prevent the spilling of material over the brim. A pair of spray heads 12, 13, are suitably mounted in the basket, to which water or other suitable liquid is fed through the pipe 14 and the branches 15, 16. The liquid may be preheated by means not shown. Preferably, the spray heads are so arranged that one head will spray the upper half of the basket while the lower half is sprayed by the other spray head. The spent liquid is tangentially discharged and passes to the sump 17 from which it flows out through the drain 18.

In operation, the plate 8 is placed over the discharge opening 7, the power is thrown on and the material is led into the rotating basket through the chute 9. If the p-nitrotoluene charged contains excess mother liquor the latter may be removed to a large extent by rotation without washing. With continued rotation of the basket, wash liquid, preferably at a temperature of about 54° to 58° C., is sprayed then through the spray heads 12, 13 onto the material which has arranged itself about the wall due to centrifugal force. The spent liquid passes through the perforations of the basket, is discharged tangentially, and flows down to the sump 17 and out through the drain 18.

When the washing is completed, the machine is stopped. The p-nitrotoluene has retained its crystalline structure although a slight surface fusion has occurred which loosely binds the crystals together. The plate 8 is raised to the top of the basket where it is retained by means not shown, and the machine again started. A scraper, not shown, directs the material to the central opening 7, through which it falls into a suitable container, not shown. The machine is then ready to receive another batch of material, after closure of the opening 7.

A p-nitrotoluene having a setting point of about 50.3° to 50.6° C., or lower, obtained by centrifuging without washing, gives a p-nitrotoluene having a setting point of about 51.1° C., when further purified by simultaneous centrifuging and washing with hot water.

I have also found that by treating crude naphthalene having a setting point, for example, of 77.5° C., in a similar manner by simultaneous centrifuging and washing with water heated to about 85°–90° C., a product is obtained which shows a setting point of 78.6° C. Probably the impurities not removed are present for the most part as enclosed or adsorbed within the particles of naphthalene.

While the spraying mechanism shown consists of a plurality of spray heads, it is to be understood that other distributing means may be used instead, the means shown being merely the preferred embodiment.

One theory or possible explanation of the principle underlying the process of the invention is that by heating the adhering liquid impurity the adhesive force between the liquid and the solid mass is lessened, possibly due to a lessening of the surface tension of the liquid, thereby rendering the removal of the liquid impurity from the solid more easy. The actual removal of the liquid impurity is aided by the erosive action of the stream of washing liquid and is also aided by the application of a force, as for example, centrifugal force, to the mass. The stream of liquid also offers a convenient medium for applying heat to the liquid impurity. In the case of some materials, the surface tension is not sufficiently lessened by heating to a temperature below the melting point of the porous solid so as to permit its removal even with the combination of centrifugal force and the erosive effect of the stream of liquid. In such cases, the liquid used is heated above the temperature of the melting point of the solid so that the surfaces of the particles of the mass are heated to incipient fusion while the bulk of the mass, probably because of its poor heat conductivity, retains its solid form. Under the influence of a force, such as centrifugal force, and the erosive effect of the liquid as it passes in a stream through the mass and over the surfaces, the fused surfaces are removed or sloughed off, carrying with them a part of the mother liquor. While the above theory is advanced as a possible explanation of the principle underlying the invention, I do not intend to be limited thereto in claiming my invention.

A functional relationship appears to exist between the quantity of liquid to be used in the purifying operation, its temperature, its velocity during contact, its time of contact with the solid and the manner in which the liquid is applied to the solid particles. With the type of apparatus herein described, it is possible to regulate the velocity of the liquid during contact and its time of contact with the porous mass of solid particles, merely by regulating the speed of the rotor. Where other forms of apparatus are used, as for example, a nutsch filter, these factors may be standardized by regulating the vacuum.

Other conditions remaining the same, the desired purification is accomplished in the minimum time when the liquid is applied to the material in a uniform manner. Where the liquid impurity is such that the force of adhesion between the solid material and the impurity is materially lessened at high temperatures, the liquid used for washing preferably is heated below the melting point of the solid material. In this way losses of yield due to melting of the material are avoided.

Where the solid material treated is such that substantially no purification is effected by treatment with wash liquid below its melting point, further precautions should be observed to secure best results. Where the liquid is applied as a spray, the spray should not be so fine as to permit cooling of the liquid below the melting point of the solid material before it reaches the mass. If the liquid is applied too cold, purification will be insufficient, for the surfaces of the solid material will not be melted to a sufficient extent to permit sloughing off of the impurity. Should the stream of liquid be so heavy as to result in extensive fusion of the mass, although greater purification may be effected thereby, the loss of yield will be increased. Excessive cooling of the liquid before contact with the mass may be avoided by locating the spray nozzle at a proper distance from the mass. An unequal or uneven distribution of the spray will result in a lowering of the yield and an impure product, for some parts of the mass will be fused and purified insufficiently, and other parts will be fused to too great an extent, resulting in unnecessary loss of material. The quantity of liquid to be used may be determined after other conditions have been standardized by testing samples of the batch from time to time until further washing no longer has an appreciable effect on the melting point or setting point of the product, or until the desired setting point or melting point has been attained.

It is to be understood that the present invention may be applied to the purification of a solid aromatic organic substance having adhering to its surfaces a solid impurity, particularly a solid impurity which has a melting point below the melting point of the main solid, for example, 2,4-dinitrotoluene which has adhering to its surfaces an incrustation consisting of isomeric dinitrotoluenes which incrustation has a melting point below that of the 2.4-dinitrotoluene, in which case the temperature of the wash liquid used is at or above the melting point of the impurity or impurities.

I claim:

1. The method of purifying a solid aromatic organic substance in the form of particles having an impurity adhering to the surfaces thereof, which comprises heating the adhering impurity to a sufficient extent to reduce its adhesion to said particles but insufficient to cause substantial melting of said particles, and removing said impurity from said particles while subjecting the surfaces of the particles to the erosive action of a rapid stream of liquid in which both the solid substance and the adhering impurity are substantially insoluble.

2. The method of purifying a porous mass of particles of a solid aromatic organic substance having a liquid impurity adhering to the surfaces thereof which comprises removing said impurity from said substance while subjecting the mass to the erosive action of a rapid stream of liquid in which both the substance and the adhering impurity are substantially insoluble, the temperature of the liquid stream being sufficiently above the melting point of the substance to reduce adhesion of the impurity to said particles but insufficient to cause substantial melting of said particles.

3. The method of purifying an aromatic organic compound in the form of crystals having a liquid impurity adhering to the surfaces of the crystals which comprises subjecting the crystals to the erosive action of a liquid passing rapidly over the surfaces thereof in which liquid both the compound and the adhering impurity are substantially insoluble, said liquid being at a temperature sufficiently above the melting point of the crystals to reduce the adhesion of the impurity to said crystals but insufficient to cause substantial melting of said crystals, and simultaneously removing said liquid impurity from said crystals by centrifugal force.

4. The method of purifying a solid aromatic organic substance in the form of particles having an impurity adhering to the surfaces thereof, which impurity is liquid at the temperature of treatment, which comprises heating the adhering impurity to a sufficient extent to reduce its adhesion to said particles but insufficient to cause substantial melting of said particles, while removing said impurity from said particles by centrifugal force, and simultaneously treating the surfaces of the particles with a rapid stream of liquid in which both the solid substance and the adhering impurity are substantially insoluble.

5. The method of purifying an aromatic organic compound in the form of crystals having a liquid impurity adhering to the surface of the crystals which comprises subjecting the crystals to the erosive action of a liquid passing rapidly over the surfaces thereof, in which liquid both the crystalline compound and the adhering impurity are substantially insoluble, said liquid being at a temperature between the melting point and approximately 10° C. above the melting point of said crystals, and simultaneously removing said liquid impurity from said crystals by centrifugal force.

6. The method of purifying a crystal mass of p-nitrotoluene having an oily liquid impurity adhering to the surface of the crystals which comprises subjecting the crystal mass to the erosive action of a stream of heated water passing over the surfaces of the crystals at a temperature sufficiently above the melting point of the crystals to reduce the adhesion of the impurity to said crystals but insufficient to cause substantial melting of said crystals, and simultaneously removing liquid from said crystals.

7. The method of purifying a crystal mass of p-nitrotoluene having a liquid impurity adhering to the surfaces of the crystals which comprises subjecting the crystal mass to the erosive action of a stream of heated liquid in which both the crystals and adhering impurity are substantially insoluble, the temperature of the liquid stream being sufficiently above the melting point of the crystals to reduce the adhesion of the impurity to said crystals but insufficient to cause substantial melting of said crystals, and simultaneously removing liquid from said crystals.

8. The method of purifying a mass of p-nitrotoluene crystals having an oily impurity adhering to the surfaces of the crystals which comprises heating the adhering impurity to a sufficient extent to lessen the force of adhesion of said impurity to said crystals but insufficient to cause substantial melting of the crystals, and simultaneously removing liquid from the crystals and subjecting the mass to the erosive action of a liquid rapidly passing over its surfaces in which liquid the p-nitrotoluene crystals are insoluble.

9. The method of purifying a crystal mass of p-nitrotoluene having a liquid impurity which is insoluble in water adhering to the surfaces of the crystals which comprises subjecting the crystal mass to the erosive action of a rapid stream of water which is at a temperature of about 4° to 8° C. above the melting point of the crystals and simultaneously removing liquid from said crystals by centrifugal force.

WESLEY MINNIS.